Figure 1:
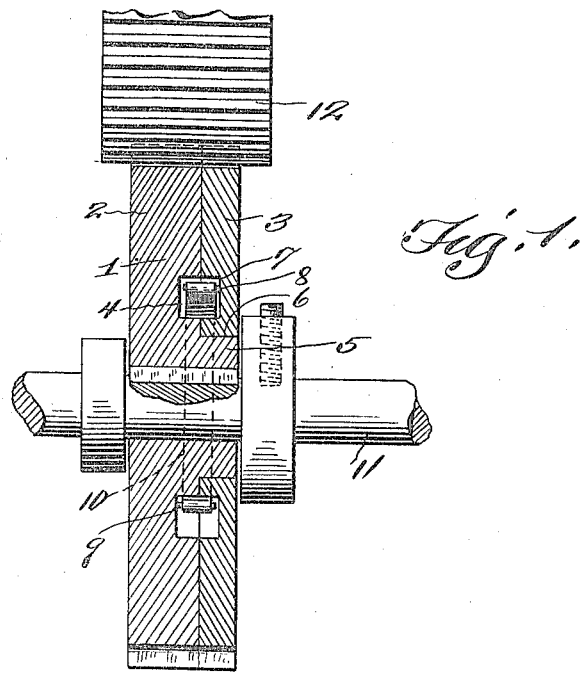

J. J. BURKE.
NOISELESS GEAR.
APPLICATION FILED APR. 19, 1916.

1,197,261.

Patented Sept. 5, 1916.

UNITED STATES PATENT OFFICE.

JOSEPH J. BURKE, OF PUTNAM, CONNECTICUT.

NOISELESS GEAR.

1,197,261.  Specification of Letters Patent.  Patented Sept. 5, 1916.

Application filed April 19, 1916. Serial No. 92,174.

*To all whom it may concern:*

Be it known that I, JOSEPH J. BURKE, a citizen of the United States, residing at Putnam, in the county of Windham, State of Connecticut, have invented a new and useful Noiseless Gear; and I do hereby declare the following to be a full, clear, and exact description of the invention, such as will enable others skilled in the art to which it appertains to make and use the same.

This invention relates to the art of machine elements, and more especially to an improved noiseless gear, and an object of the invention is to provide a gear of this kind, so constructed as to prevent noise known as "clocking", and such gear is adapted principally for use, where noisy gears are obnoxious.

Another object of the invention is to provide a device of this kind comprising simple and improved, and practical features of construction.

One of the features of construction is the provision of a device of this kind consisting of two gear members, one mounted upon the other, and one adapted to be keyed to a shaft, and provided with a yieldable or spring tensioned device between the two gear members, adapted to be tensioned by adjusting one gear member relative to the other, after which the teeth of the gear members are thrown in mesh with an adjacent gear (not shown).

In practical fields, the details of construction may necessitate alterations, falling within the scope of what is claimed.

The invention comprises further features and combination of parts, as hereinafter set forth, shown in the drawings and claimed.

Figure 2:
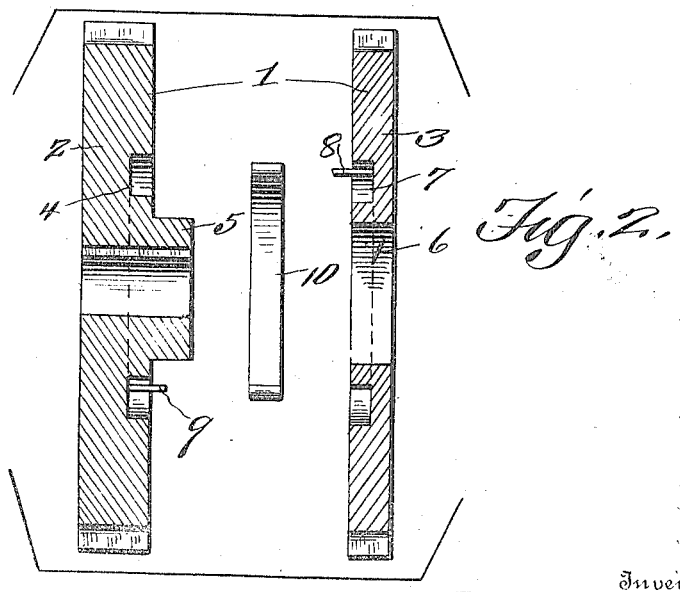

In the drawings: Figure 1 is a sectional view through the improved noiseless gear. Fig. 2 illustrates the two members of the gear separated, and the yieldable or tensioned device disassembled.

Referring more especially to the drawings, 1 designates a gear as a whole, which comprises two gear members 2 and 3. The gear member 2 upon one face is provided with an annular depression or annular countersunken recess 4, and an adjoining cylindrical boss 5. The other gear member is provided with a circular opening 6, of a diameter corresponding with and adapted to receive the boss 5 of the gear member 2. One face of the gear member 3 is provided with an annular depression 7 corresponding with and adapted to register with the depression 4 of the gear member 2. Projecting from the depression 7 is a laterally extending pin 8, and extending from the depression 4 is a second laterally extending pin 9, there being a leaf spring or tensioning device connecting the two pins 8 and 9, which leaf spring tensioning device is designated by the numeral 10. The gear member 2 is keyed upon a shaft 11 as shown, and after the gear members have been adjusted relative to each other, the teeth of the two gear members are arranged in mesh with the teeth of an adjacent gear 12. By this construction it will be seen that when the gear comprising the two gear members rotate, the usual "clocking" noise incident to the teeth of the gears meshing is avoided, particularly by provision of the leaf spring tensioning device.

The invention having been set forth, what is claimed as new and useful is:

A noiseless gear, comprising a pair of gear members of corresponding diameters and having teeth of corresponding pitch, one of said gear members having a circular boss concentric therewith and adapted to be keyed upon a shaft, the other gear member having a concentrically arranged circular opening corresponding in diameter with and fitting the boss, the adjacent faces of the gear members having annular depressions corresponding with and registering concentrically with each other, each of the annular depressions having laterally extending pins, and a leaf spring tensioning device arranged in said registering annular depressions and connecting said pins.

In testimony whereof I have signed my name to this specification in the presence of two subscribing witnesses.

JOSEPH J. BURKE.

Witnesses:
ERNEST C. MORSE,
RAYMOND S. MIDBURY.